United States Patent
Hoffmann et al.

(10) Patent No.: US 6,994,499 B2
(45) Date of Patent: Feb. 7, 2006

(54) DEVICE FOR FASTENING TUBULAR OBJECTS

(75) Inventors: Armin Hoffmann, Landsberg (DE); Armin Herb, Apfeldorf (DE); Stefan Unverzagt, Penzing (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/424,315

(22) Filed: Apr. 28, 2003

(65) Prior Publication Data
US 2003/0206785 A1 Nov. 6, 2003

(30) Foreign Application Priority Data
May 2, 2002 (DE) ................................ 102 19 732

(51) Int. Cl.
*F16B 27/00* (2006.01)

(52) U.S. Cl. ........................................ 411/84; 411/437

(58) Field of Classification Search ............... 411/84, 411/85, 104, 477, 432
See application file for complete search history.

(56) References Cited

U.S. PATENT DOCUMENTS

| 2,314,509 | A | * | 3/1943 | Olson .......................... 411/280 |
| 2,328,587 | A | * | 9/1943 | Simmons ..................... 411/530 |
| 2,403,566 | A | * | 7/1946 | Thorp et al. ................. 411/277 |
| 2,469,311 | A | * | 5/1949 | Poupitch ...................... 411/84 |
| 2,797,606 | A | * | 7/1957 | Poupitch ...................... 411/437 |
| 3,680,620 | A | | 8/1972 | Gotschel et al. |
| 4,917,553 | A | | 4/1990 | Muller |
| 5,655,865 | A | * | 8/1997 | Plank et al. .................. 411/85 |
| 5,833,417 | A | * | 11/1998 | Sargent et al. ............... 411/85 |
| 6,447,200 | B1 | | 9/2002 | Hungerford, III |
| 6,575,680 | B2 | | 6/2003 | Herle et al. |

* cited by examiner

Primary Examiner—Flemming Saether
(74) Attorney, Agent, or Firm—Abelman, Frayne & Schwab

(57) ABSTRACT

A device for fastening tubular objects includes a C-shaped mounting rail (3) and a rail nut formed of a hollow profile having at least two constriction areas (13a, 13b and 14a, 14b) defining a through-opening (8) which is formed by two hollow cylindrical sections (9a, 9b) extending parallel to a longitudinal axis of the through-opening (8) and having respective inner thread sections (10a, 10b) for receiving a fastening element there between.

7 Claims, 2 Drawing Sheets

DEVICE FOR FASTENING TUBULAR OBJECTS

BACKGROUND OF THE INVENTION

1. Field of the Invention

The present invention relates to a device for fastening tubes and tubular objects and includes a C-shaped mounting rail having an elongate opening, and a rail nut having a width measured in a direction parallel to the retaining plate plane and corresponding at most to a width of the elongate opening of the mounting rail, and a length measured transverse to the width direction and which is greater than the width of the elongate opening.

2. Description of the Prior Art

Fastening devices of the type described above find particular application for suspending and bracing of objects such as, e.g., tubes and the like. To this end, a mounting rail having an elongate opening is secured to a constructional component or part, e.g., with several segment anchors. For fastening a fastening element, a retaining plate is inserted into the interior of the mounting rail through the rail elongate opening and is pivoted by an angle, e.g., 90° and engages, from behind the free ends, so-called retaining projections or edges of the elongate opening. For securing a fastening element, e.g., a threaded rod, the retaining plate has a through-bore provided with an inner thread that form-lockingly engages a complementary outer profile provided at least on a portion of the fastening element. In order to insure the insertion of the retaining plate through the elongate opening, the width of the retaining plate corresponds at most to the width of the elongate opening provided in the mounting rail. The engagement of the retaining projection of the mounting rail by the retaining plate is insured by having the length of the retaining plate, which is measured transverse to the width direction of the retaining plate, greater than the width of the elongate opening.

German Patent DE 38 11 974 C2 discloses a fastening device including a C-shaped mounting rail and non-circular retaining part which is formed, e.g., as a cast part.

The drawback of the known device consists in that for producing the retaining part, a lot of material is spent in order to obtained the desired dimensions, which adversely affects the economy of the production.

A further drawback consists in that the excessive weight of the retaining part increases the overall weight of the fastening device, in particular, when several retaining plates are required.

Accordingly, an object of the invention is a fastening device with a mounting rail and a rail nut that can be economically produced and has a reduced weight.

Another object of the invention is a fastening device of a type described above and having that would insure a high stability and a good performance under tension loads.

SUMMARY OF THE INVENTION

These and other objects of the present invention, which will become apparent hereinafter, are achieved by providing, in the device of the type described a rail nut formed of a hollow profile having at least two constriction areas defining a through-opening which is formed by two hollow cylindrical sections extending parallel to a longitudinal axis of the through-opening and having respective inner thread sections for securing a fastening element therebetween.

The formation of the rail nut of a hollow profile permits to use for manufacturing of the rail nuts, conventional standard profiles which are characterized by small production costs, e.g., the hollow profiles can be formed of tubular, rectangular, or polygonal profiles. The constriction areas provide a through-opening corresponding to a diameter of fastening elements used with the fastening device. Further, a plurality of different rail nuts can be produced from one and the same profile, e.g., the through-opening for a threaded rod with a M8-, M10-, M12-thread can be formed by producing one and the same hollow profile. This permits to use the same tubular profile for producing different rail nuts. The inner thread sections of the cylindrical sections are provided, e.g., with a standard thread. However, other specific thread profiles can be provided.

The constriction areas form about the through opening wave-shaped webs of the rail nut, which prevent the overload in the region of the inner thread from damaging the rail nut and which increase the stability of the rail nut. Despite of that, the rail nuts according to the present invention can be produced with reduced manufacturing costs.

Advantageously, at least one retaining section is provided radially outwardly of each constriction area. The retaining section is formed by accumulation of material in an area parallel to the cross-sectional plane extending perpendicular to the length of the rail nut and parallel to the width of the longitudinal opening of the mounting rail. In order to increase the contact area of the retaining section with the free edges of the mounting rail, the rail nut can be formed with a buckling area along its length, while retaining the desired diameter of the through-opening. In this way, the through-opening forms a small portion of the surface cross-section of the retaining section.

Advantageously, the retaining sections are provided with knurls which engage the edges, e.g., of webs provided on the mounting rail. This permits the rail nut to absorb loads, in particular with forces acting in the longitudinal direction of the mounting rail, without the rail nut being displaced in an undesirable manner. Advantageously, the free edges of the mounting rail are also provided with knurls are engaged by the knurls which are provided on the retaining sections.

Advantageously, the opposite wall sections of the construction areas are connected with each other. The opposite wall sections can be connected, e.g., by welding, soldering, or gluing. As a result, the through-opening and, thus, the inner thread provided therein retain their shape for a long-time even with alternating loads, which increases the service life of the rail nut. With such rail nut, the material consumption, the costs of production, and the load-carrying ability are optimal.

Advantageously, the hollow profile, of which the rail nut is formed, is formed of a strip material. The strip material is cut off taking into account the inner dimensions of the mounting rail and the loads acting on the rail nut, with the ends of the cut-off strip material, which extend in the axial direction of the through-opening being connected with each other, e.g., by welding, soldering, or gluing. Further, the structure and strength of the strip material also influence to what length the strip material is cut off. The present invention is also applicable to rail nuts which because of their circumferential length, cannot be produced from conventional hollow profile. This is the case when rail nuts, which have a special have a special shapes, need to be produced. The constriction areas can be formed after the axial ends of the strip material are connected or before the connection of the ends of the strip material.

Also, the hollow profile can be formed of at least two workpieces. The workpieces, for producing a rail nut, have their ends, which extend in the axial direction of the through-opening, connected with each other e.g., by welding, soldering, or gluing.

The workpieces can be formed, e.g., as semi-finished products, with a rail nut being formed of two or more workpieces in a separate working step. In this way, the workpieces, which form the retaining section, can be formed of a different material than the workpieces which form the region of the through-opening. In this case, particular demands with regard to the load-carrying ability of the rail nut can be taken into account. Also, the connectability of different material with each other also should be taken into account when selecting the materials for different workpieces.

Advantageously, metal sheet is used for forming the hollow profiles the rail nuts are made of. The dimensions of the rail nuts are selected taking into consideration the space available for the fastening device. Besides metals, a suitable plastic material can be used for producing rail nuts.

The novel features of the present invention, which are considered as characteristic for the invention, are set forth in the appended claims. The invention itself, however both as to its construction and its mode of operation, together with additional advantages and object thereof, will be best understood from the following detailed description of preferred embodiments, when read with reference to the accompanying drawing.

DESCRIPTION OF THE PREFERRED EMBODIMENTS

Figure 1:
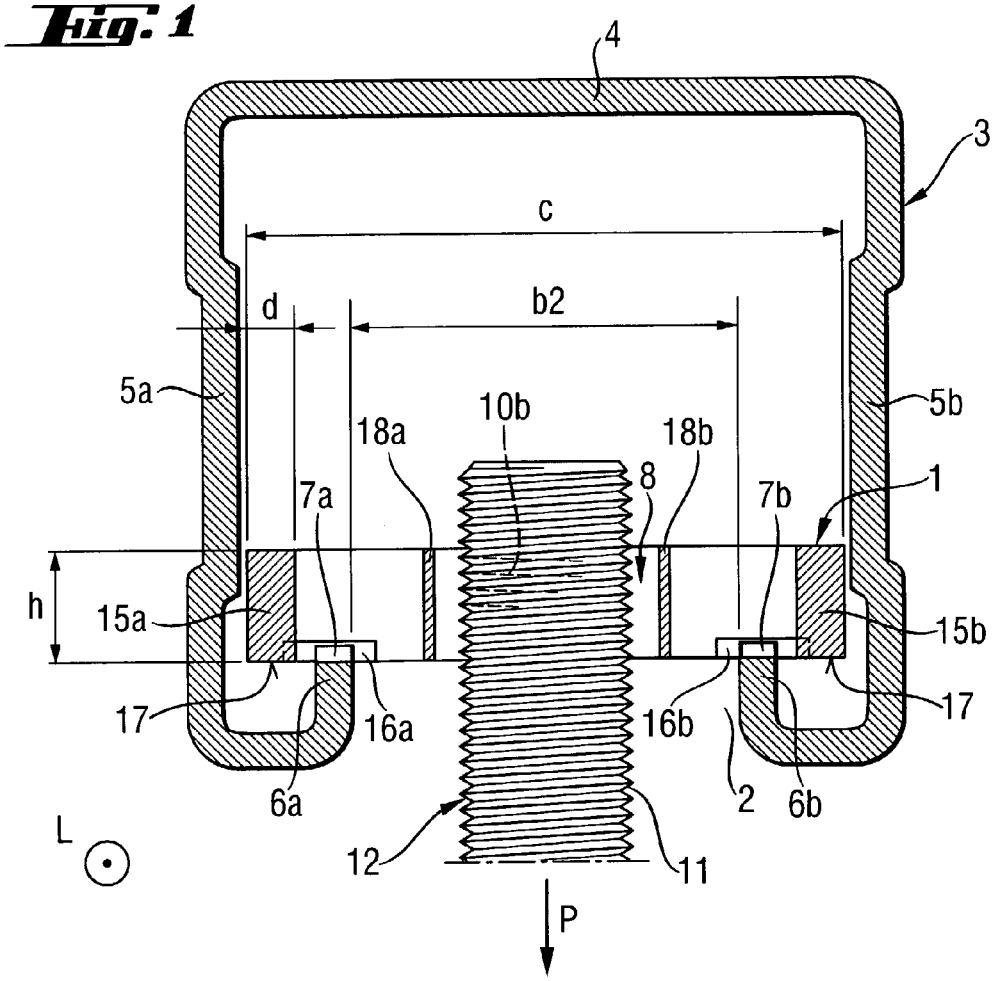
FIG. 1 a cross-sectional view of a fastening device according to the present invention, together with a fastening element.

A fastening device according to the present invention, which is shown in FIG. 1, has a C-shaped cross-section and includes a mounting rail 3 provided with an elongate opening 2, and a rail nut 1.

The elongate mounting rail 3, which is shown in FIG. 1, has a substantially C-shaped cross-section and is formed, preferably, of a single strip of a galvanized or stainless metal sheet. The mounting rail 3 has a rear wall 4 and two side walls 5a and 5b provided at opposite longitudinal sides of the rear wall and extending substantially perpendicular to the rear wall 4. At their free front ends, the side walls 5a, 5b are bent inward at a substantially right angle, e.g., forming a U-shaped profile, and form two webs 6a and 6b extending parallel to the rear wall 4. The webs 6a, 6b form the elongate opening 2 which extends in the longitudinal direction L of the mounting rail 3. The sides of the webs 6a, 6b adjacent to the rear wall 4 can be provided with straight knurls 7a, 7b, respectively.

Figure 2:
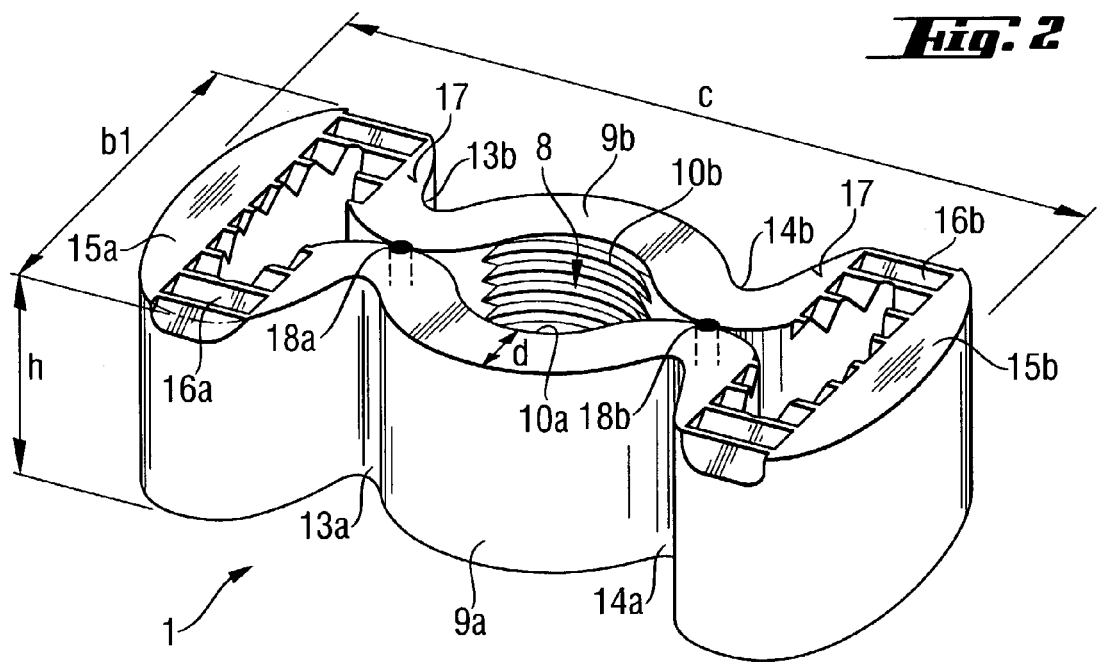
FIG. 2 a perspective bottom view of a rail nut of the fastening device shown in FIG. 1, with the rail nut being pivoted, with respect to the view shown in FIG. 1, by 180° upward about its longitudinal axis.
Figure 3:
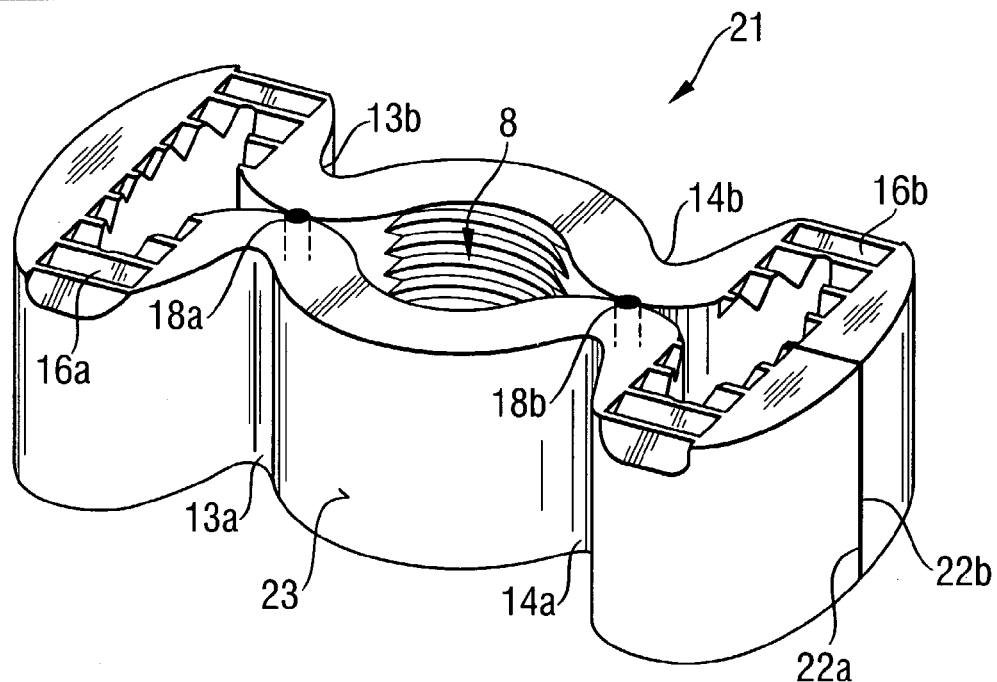
FIG. 3 a perspective view similar to that of FIG. 2 of another embodiment of a rail nut.
Figure 4:
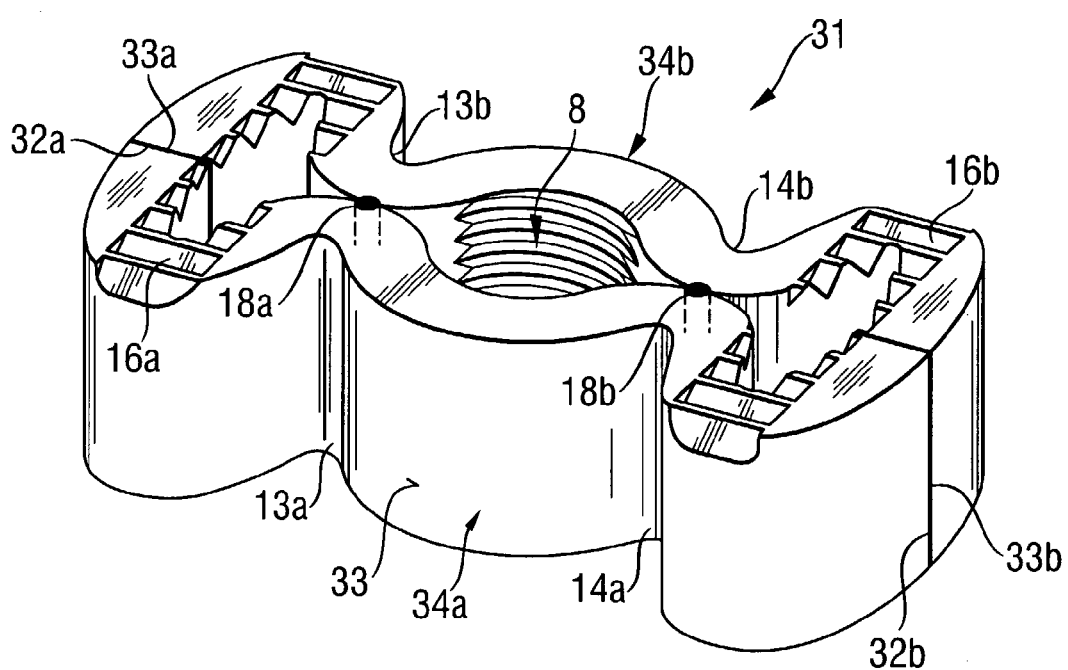
FIG. 4 a perspective view similar to that of FIGS. 2–3 of a further embodiment of a rail nut.

The rail nut 1 has a through opening transverse to the longitudinal opening 2 and formed of two hollow cylindrical sections 9a, 9b, as particularly shown in FIGS. 2–4. The hollow cylindrical sections 9a, 9b have each an inner thread section 10a, 10b, respectively. The through-openings is designed for formlockingly receiving a fastening element, e.g., a bolt 12 having an outer thread 11 which is shown in FIG. 1. The rail nut 1 has a width b1 measured in a direction parallel to the cross-sectional plane or to the plane formed by the longitudinal opening 2. The width b1 at most corresponds to the width b2 of the longitudinal opening 2. The rail nut 1 has a length c measured in a direction parallel to the cross-sectional direction and transverse to the width thereof. The length c of the rail nut 1 is larger than the width b2 of the longitudinal opening 2. The rail nut 1 further has a substantially uniform thickness d.

For manufacturing of the rail nut 1 shown in FIG. 2, a tubular profile is used which is cut into sections of a desired length, i.e., with a length corresponding to the height h of the rail nut. With, e.g., a pincer-like tool, the cut-off tubular profile is so deformed that as a result of the deformation process, constriction areas 13a, 13b, 14a, 14b of the through-opening 8, in which the bolt 12 is received, are formed. To increase the stability of the rail nut, the opposite wall sections, at points 18a, 18b, of the constriction areas 13a, 13b and 14a, 14b are connected with each other by welding, soldering, or gluing. The beads, which are formed by the constriction areas 13a, 13b and 14a, 14b, serve, on one hand, for stabilizing the inner thread sections 10a, 10b and, on the other hand, for providing an overload protection for the fastening device, e.g., a too high load P is applied to a fastening element, the bolt 12, leads to collapse of the rail nut 1 in the region of the constriction areas 13a, 13b, 14a, 14b. The beads prevent damage of the entire fastening device when an unpermissibly high load P is applied to the bolt 12.

Sidewise and radially outwardly of the constriction areas 13a, 13b and 14a, 14b, there are provided respective retaining sections 15a, 15b which are provided, on their sides 17 adjacent to the longitudinal opening 2, with knurls 16a, 16b cooperating with knurls 7a, 7b which are provided on free edges of the mounting rail 3.

The rail nut 21, which is shown in FIG. 3, differs from that of FIG. 2 in that it is formed of a strip material that has its ends 22a, 22b, which extend in an axial direction of the trough-opening 8, connected by welding, soldering, gluing and the like. The formation of the construction areas 13a, 13b and 14a, 14b of the wall 23 can take place before or after the connection of ends 22a, 22b.

The rail nut 31, which is shown in FIG. 4, is formed of two workpieces 34a, 34b that have their ends 32a, 32b and 33a, 33b, which extend in direction parallel to an axial direction parallel to an axial direction of the through-opening 8, connected by welding, soldering, gluing and the like. The formation of the constriction areas 13a, 13b, 14a, 14b can be effected as before so after the connection of the workpieces 34a, 34b.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A device for fastening of tubular objects, comprising:
a C-shaped mounting rail (3) having an elongate opening (2); and
a rail nut (1; 21; 31) having a width (b1) measured in a direction parallel to a longitudinal extent of the mounting rail (3), a uniform height (h) measured between extending parallel to each other, axially spaced, upper and lower surfaces (1' and 1"), and a length (c) measured transverse to a width direction of the rail nut (1; 21; 31) and parallel to the cross-sectional plane and which is greater than a width (b2) of the elongate opening (2), the rail nut width (b1) corresponding at most to the width (b2) of the elongate opening (2);
wherein the rail nut (1; 21; 31) is formed of a hollow profile provided with at least two constriction areas (13a, 13b and 14a, 14b) spaced from each other and defining a through-opening (8) which is formed by two opposite arcuate sections (9a, 9b) of the hollow profile extending between the at least two constriction areas (13a, 13b and 14a, 14b) parallel to a longitudinal axis of the through-opening (8) and having respective inner thread sections (10a, 10b) for securing therebetween a fastening element having a thread complementary to a thread of the thread sections (10a, 10b); and
wherein opposite wall sections of the at least two constriction areas (13a, 13b; 14a, 14b) are connected with each other.

2. A fastening device according to claim 1, wherein the rail nut (1; 21; 31) has at least one retaining section (15a, 15b) provided radially outwardly of each of the at least two constriction areas (13a, 13b and 14a, 14b).

3. A fastening device according to claim 2, wherein the retaining sections (15a, 15b) have respective knurls (16a, 16b) engageable with respective khurls (7a, 7b) provided on the mounting rail (3).

4. A fastening device according to claim 1, wherein the hollow profile is formed of a strip material.

5. A fastening device according to claim 4, wherein the strip material is obtained from sheet metal.

6. A fastening device according to claim 1, wherein the hollow profile is formed of a at least two workpieces (34a, 34b).

7. A fastening device according to claim 6, wherein the at least two workpieces are formed of sheet metal.

* * * * *